United States Patent Office 2,868,808
Patented Jan. 13, 1959

2,868,808

11-OXYGENATED 17α,21-DIHYDROXYALLOPREG-NAN-20-ONE AND ESTERS THEREOF

John C. Babcock, Portage Township, Kalamazoo County, Mich., assignor to The Upjohn Company, Kalamazoo, Mich., a corporation of Michigan No Drawing. Application April 14, 1958
Serial No. 728,046

21 Claims. (Cl. 260—397.1)

This invention relates to 11-oxygenated 17α,21-dihydroxyallopregnan-20-one, wherein the 11-oxygen substituent is selected from the group consisting of keto and β-hydroxy, and 21-esters thereof, to novel intermediates in the production thereof, and to processes for the production of the novel compounds and novel intermediates.

The novel compounds of this invention, 11β,17α,21-trihydroxyallopregnan-20-one and the 21-esters thereof, and 17α,21-dihydroxyallopregnane-11,20-dione and the 21-esters thereof, possess anti-inflammatory activity and central nervous system regulating activity. The novel intermediates of this invention possess central nervous system regulating activity. Thus, for example, 17(20)-allopregnene-11β,21-diol (V. below) is active in the potentiation-sleep assay, increasing sleeping time by more than 300 percent. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

The new compounds and the processes of the present invention are illustratively represented by the following formulae:

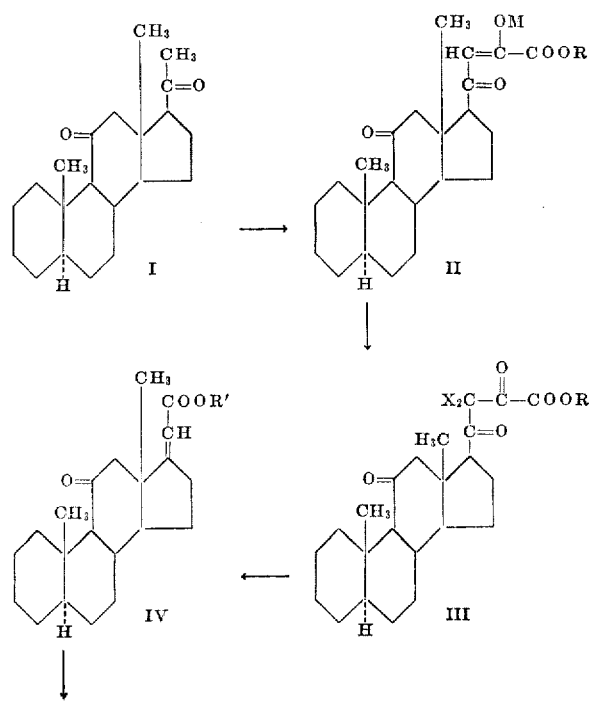

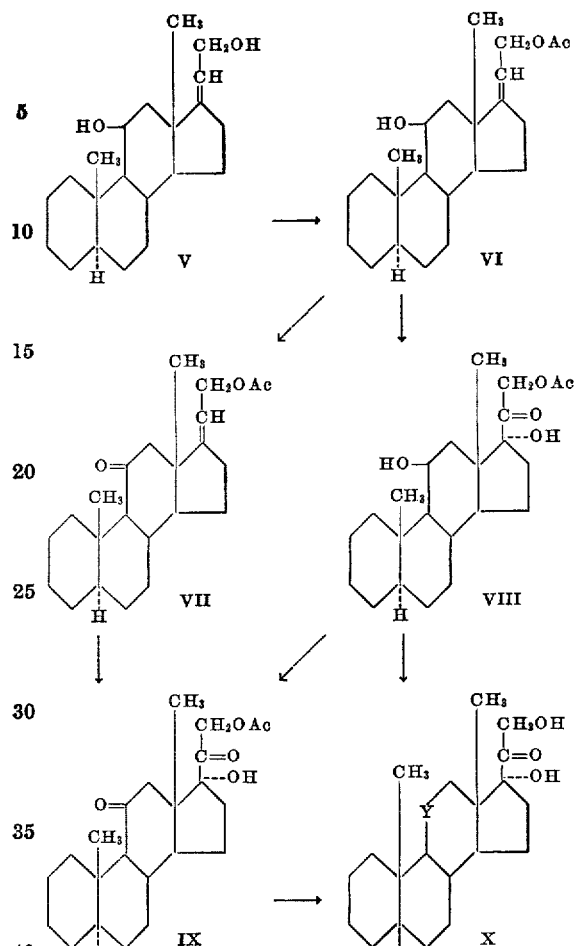

wherein R is lower alkyl, R' is hydrogen or lower alkyl, M is an alkali metal ion, X is a halogen having an atomic weight from 35 to eighty, inclusive, i. e., chlorine or bromine, Y is selected from the group consisting of the carbonyl radical (>C=O) and the β-hydroxymethylene radical

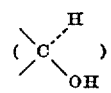

and Ac is the acyl radical of an organic acid, preferably a hydrocarbon carboxylic acid containing from one to twelve carbon atoms, inclusive. The term "lower alkyl" when used herein, refers to an alkyl radical of from one to eight carbon atoms, inclusive, e. g., methyl, ethyl, propyl, butyl, amyl, hexyl, heptyl, ethylhexyl and octyl.

The process of the present invention comprises: treating allopregnane-11,20-dione (I) with a dialkyl ester of oxalic acid, wherein the alkyl groups contain from one to eight carbon atoms, inclusive, in the presence of an alkali-metal base to obtain an alkali-metal enolate of 21-alkoxyoxalylallopregnane-11,20-dione (II), treating the thus-obtained enolate with a halogen having an atomic weight between 35 and eighty, inclusive, to produce 21,21-dihalo - 21 - alkoxyoxalylallopregnane - 11,20 - dione (III) treating the thus-obtained 21,21-dihalosteroid with an alkali-metal alkoxide, wherein the alkyl group contains from one to eight carbon atoms, inclusive, to obtain alkyl 11-keto-17(20)-allopregnen-21-oate (IV), treating the thus-obtained alkyl 11-keto-17(20)-allopregnen-21-oate with lithium aluminum hydride to obtain 17(20)-allopregnene-11β,21-diol (V), treating the thus-obtained 17(20)-allopregnene-11β,21-diol with an acylating agent, e. g., the acid chlorides, bromides, and anhydrides of an organic carboxylic acid containing from one to twelve carbon atoms, inclusive, to obtain 17(20)-allopregnene-11β,21-diol 21-acylate (VI), treating 17(20)-allopregnene-11β,21-diol 21-acylate with an oxidizing agent to obtain 21-hydroxy-17(20)-allopregnen-11-one 21-acylate (VII), treating 11-oxygenated 17(20)-allopregnen-21-ol 21-acylate (VI and VII), wherein the 11-oxygen substituent is keto or β-hydroxy, with osmium tetroxide and an oxidizing agent selected from the group consisting of peracids and peroxides to obtain the corresponding 11-oxygenated 17α-21-dihydroxy-allopregnan-20-one 21-acylate (VIII and IX), and finally treating the thus-obtained 11-oxygenated 17α,21-dihydroxy-allopregnan-20-one 21-acylate with a hydrolyzing agent such as aqueous alkali metal bicarbonate to obtain the corresponding 11-oxygenated 17α,21-dihydroxyallopregnan-20-one (X).

The preferred compounds having the 17(20)-double bond have the cis configuration, because the cis isomer can ultimately be converted in higher yields in the oxidative hydroxylation step than is ordinarily possible with the trans isomer. It should be understood, however, that the trans isomer or mixtures of the cis and trans isomers can be used with satisfactory results.

In carrying out the process of the present invention, allopregnane-11,20-dione (I), prepared as described in Preparation 2 is contacted with a lower-alkyl ester of oxalic acid in the presence of an alkali metal base, such as sodium or potassium alkoxide, at a temperature between about zero degrees centigrade and the boiling point of the reaction mixture, usually in a solvent such as, for example, toluene, benzene, methanol, ethanol, tertiary butyl alcohol, mixtures of these, or the like, to produce a 21-alkoxyoxalylallopregnane-11,20-dione alkali-metal enolate, represented by Formula II wherein M is an alkali metal, and the alkoxy group preferably contains from one to eight carbon atoms, inclusive, with methoxy and ethoxy being preferred.

The thus-obtained 21-alkoxyoxalylallopregnane-11,20-dione metal enolate is then treated with a halogenating agent to produce a 21,21-dihalo-21-alkoxyoxalylallopregnane-3,20-dione (III). The halogenation is usually conducted in an organic solvent which is non-reactive with the steroid under the conditions of the reaction. Methanol and ethanol have been found to be particularly useful solvents and are usually preferred, although chloroform or methylene chloride in the presence of pyridine, acetic acid in the presence of potassium acetate, and others can also be used. Since the presence of a base, e. g., an alkali-metal salt of an aliphatic acid, of carbonic acid, e. g., sodium carbonate, sodium bicarbonate, or the like enhances the yield of the desired product, the halogenation is usually conducted in the presence of a base, especially potassium or sodium acetate. The halogenating agents are halogens having an atomic weight from 35 to eighty, inclusive, i. e., chlorine or bromine. When bromine is used as the halogenating agent, it is usually added in cold methanol, although chloroform, methylene chloride, or the like can also be used as solvents. Bromine can also be added without a diluent. When chlorine is used it may be bubbled into the reaction mixture or used as a solution of the gas in an organic solvent. In carrying out the halogenation about two moles of halogen to one mole of starting steroid are employed. Use of substantially higher or lower ratios of halogen to starting steroid usually results in less than optimum yields of product. The reaction is usually conducted at between zero and ten degrees centigrade, although temperatures from about minus ten to sixty degrees centigrade are operative.

The thus-obtained 21,21-dihalo-21-alkoxyoxalylallopregnane-11,20-dione, preferably in an alkanol solvent, is not necessarily isolated but can be treated directly with a base such as an alkali-metal hydroxide, an alkali-metal alcoholate, or the like, to produce an alkyl 11-keto-17(20)-allopregnen-21-oate. Since the particular alkyl ester produced in the above reaction is determined by the alkyl group of the alkali-metal alkoxide employed in the reaction, when the reaction solvent is an alkanol, the alkyl group of the alkanol solvent is preferably the same as the alkyl group of the alkali-metal alkoxide employed in the reaction, thus avoiding the possibility of mixed ester formation due to exchange reactions. The alkyl group of the alkali-metal alkoxide preferably contains from one to eight carbon atoms, inclusive, methyl and ethyl being preferred. The reaction is usually complete in ten to sixty minutes at room temperature, however, temperatures between about zero and 100 degrees centigrade are operative. The alkyl ester can be isolated, when the solvent is water miscible, by adding a large volume of water and separating the product by filtration. 11-keto-17(20)-allopregnen-21-oic acid is obtained in the same manner as above, except that the alkali-metal alkoxide of the reaction is replaced by an alkali-metal hydroxide, and that the reaction usually is carried out in a solvent containing water. After the reaction has gone to completion, acidification of the reaction mixture is productive of the free acid.

The thus-obtained 11-keto-17(20)-allopregnen-21-oic acid or lower-alkyl ester thereof (IV) is treated with a reducing agent, such as lithium aluminum hydride, lithium borohydride, or sodium borohydride in the presence of aluminum chloride to produce 17(20)-allopregnene-11β,21-diol (V). The lithium aluminum hydride reduction is usually carried out by adding a solution of 11-keto-17(20)-allopregnen-21-oic acid or a lower-alkyl ester thereof in an organic solvent which is non-reactive under the conditions of the reaction with the reagents to a lithium aluminum hydride solution or suspension in ether. Other solvents which can be used include dioxane, tetrahydrofuran or the like, as well as other solvents commonly used in lithium aluminum hydride reductions. When ether is used, the reaction is usually carried out at a temperature between about room temperature and the boiling point of the solvent, although temperatures substantially below room temperature are sometimes successfully employed. The lithium aluminum hydride is usually employed in a substantial excess of the chemical equivalent amount to ensure optimum yields of desired product. When the steroid and lithium aluminum hydride have been thoroughly mixed and the heat of reaction has subsided the reaction is essentially complete. Continued stirring or heating, or both, are usually employed, however, to ensure completeness of reaction. The resulting steroid-lithium aluminum hydride complex and excess lithium aluminum hydride are decomposed by the careful addition of water, aqueous ammonium chloride, or an acid, an ester, or ketone, followed by water, to the reaction mixture. Separating the organic phase from the aqueous phase of the decomposed reaction mixture and then distilling the solvent therefrom leaves a residue consisting essentially of the desired 17(20)-allopregnene-11β,21-diol (V).

Esterification of the 17(20)-allopregnene-11β,21-diol (V) to produce the corresponding 21-acyloxy compound (VI) can be performed under esterification conditions known in the art, e. g., by the reaction of the 21-hydroxy-steroid with an acylating agent such as an acid anhydride, acid chloride or bromide, or a ketene of a hydrocarbon carboxylic acid, or by reaction with the selected acid in the presence of an esterification catalyst, or with an ester under ester-exchange reaction conditions. Reaction conditions which are apt to affect the labile 11β-hydroxy group should be avoided. Compounds thus produced include the 21-acyloxy compounds represented by Formula VI, wherein Ac is the acyl radical of an organic carboxylic acid, preferably a hydrocarbon carboxylic acid containing from one to twelve carbon atoms, inclusive, e. g., formic, propionic, butyric, isobutyric valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α - naphthoic, 3 - methyl - α - naphthoic, an aralkyl acid, e. g., phenylacetic, phenylpropionic, diphenylacetic, triphenylacetic, an unsaturated acid, e. g., acrylic, maleic, vinyl acetic, propionic, undecolic, etc. Use of an excess of acylating reagent in the reaction is preferred unless conditions are such that the 11β-hydroxy group tends to be esterified. The 11β-hydroxy group is not esterified under normal acylation conditions. Solvents which are frequently employed in carrying out the acylating process include benzene, toluene, acetic acid, pyridine, and the like. Preferably the acylation is carried out at about room temperature or somewhat above to minimize decomposition of the starting steroid or product, although higher and lower temperatures, e. g., from about zero degrees centigrade to the boiling point of the reaction mixture may also be used. Isolation of the 21-acylated product is conveniently achieved by adding a large volume of water to the reaction mixture if the reaction solvent is water miscible and thus precipitating the product, or if the solvent is water immiscible by distilling the solvent from the reaction mixture at reduced pressure to leave a residue consisting essentially of the desired product.

The oxidative hydroxylation of 17(20)-allopregnene-11β,21-diol 21-acylate (VI) to produce 11β,17α,21-trihydroxy-allopregnan-20-one 21-acylate (VIII) is carried out by reaction with osmium tetroxide and an oxidizing agent such as hydrogen peroxide, peracids, alkyl peroxides, amine oxide peroxides, and the like. A preferred procedure involves reaction of a 17(20)-allopregnene-11β, 21-diol 21-acylate with osmium tetroxide and an oxidizing agent, preferably N-methylmorpholine oxide peroxide in an organic solvent. Tertiary butyl alcohol is the preferred solvent but other solvents such as methanol, ethanol, acetone, dioxane and the like are operative. The reaction can be conducted either in the light or in the dark and usualy at room temperature, although temperatures of ten degrees centigrade to the boiling point are operative. The time required for the reaction is not critical and can be varied between about one and 72 hours, the length of time being dependent on the temperature and the amount of osmium tetroxide and oxidizing agent employed.

The thus-obtained 11β,17α,21-trihydroxyallopregnan-20-one 21-acylate (VIII) can be oxidized to the corresponding 11-keto compound with an oxidizing agent. Oxidizing agents such as chromic acid, potassium dichromate, a haloamide, and the like are operative. The oxidation can be carried out by a variety of methods, such as for example, by oxidizing the said 11β-hydroxy steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-haloacylamides and imides. Thereafter, the resulting 17α,21-dihydroxyallopregnane-11,20-dione 21-acylate (IX) is recovered by conventional means, such as by dilution with water and extraction with water-immiscible solvents, e. g., methylene chloride, ether, benzene, toluene or the like.

Alternatively, 17α,21-dihydroxyallopregnane-11,20-dione 21-acylate (IX) can be prepared from 17(20)-allopregnene-11β,21-diol 21-acylate (VI) by first oxidizing the latter compound, for example with chromium trioxide in acetic acid, then subjecting the thus-obtained 21-hydroxy-17(20)-allopregnen-11-one 21-acylate (VII) to oxidative hydroxylation, for example with osmium tetroxide and N-methylmorpholine oxide peroxide, as described above, to obtain 17α,21-dihydroxyallopregnane-11,20-dione 21-acylate (IX).

11 - oxygenated 17α,21 - dihydroxyallopregnan-20-one (X), 11β,17α,21-trihydroxyallopregnan-20-one or 17α,21-dihydroxyallopregnane-11,20-dione can be obtained from the corresponding 21-acylates by hydrolysis in accordance with known methods for hydrolyzing Compound F 21-acylates to free Compound F alcohol. A preferred procedure is to employ at least a molar equivalent of an alkali-metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., sulfuric or acetic acid, and the hydrolyzed product 11β,17α,21-trihydroxyallopregnan-20-one, or 17α,21-dihydroxyallopregnane-11,20-dione (X), recovered from the reaction mixture by evaporation of the solvent and crystallization of the residue, extraction with methylene chloride, or the like. Other 21-acylates, when desired, can be prepared by re-esterification of the 21-hydroxy-compounds by esterification procedures hereinbefore described. The preferred 21-acylates are those derived from an organic carboxylic acid, preferably a hydrocarbon carboxylic acid containing from one to twelve carbon atoms, inclusive.

The novel compounds of this invention, 11β,17α,21-trihydroxyallopregnan-20-one and the 21-esters thereof, and 17α,21-dihydroxyallopregnane-11,20-dione and the 21-esters thereof, in addition to possessing anti-inflammatory activity and central nervous system regulating activity, are useful as intermediates for the preparation of (1) the 21-desoxy and 21-fluoro analogs, namely 11β,17α-dihydroxyallopregnan-20-one, 17α - hydroxyallopregnane-11,20-dione, 21-fluoro-11β,17α - dihydroxyallopregnan-20-one, and 21-fluoro-17α-hydroxyallopregnane-11,20-dione; (2) the 9(11)-unsaturated analog, namely, 17α,21-dihydroxy-9(11)-allopregnen-20-one and the 21-esters thereof; (3) the 9(11)-unsaturated 21-desoxy and 21-fluoro analogs, namely, 17α-hydroxy-9(11)-allopregnen-20-one and 21-fluoro-17α-hydroxy-9(11)-allopregnen-20-one; (4) the 9α-halo analogs, namely, 9α-halo-11β,-17α,21-trihydroxyallopregnan-20-one and 9α-halo-17α,21-dihydroxyallopregnane-11,20-dione and the 21-esters thereof; (5) the 9α-halo-21-desoxy and 9α-halo-21-fluoro analogs, namely, 9α-halo-11β,17α-dihydroxyallopregnan-20-one, 9α-halo - 17α - hydroxyallopregnane-11,20-dione, 9α-halo-21-fluoro-11β,17α - dihydroxyallopregnan-20-one, and 9α-halo-21-fluoro-17α - hydroxyallopregnane - 11,20-dione. The above compounds and the 21-esters of the 21-hydroxy compounds above, also possess the anti-inflammatory and central nervous system regulating activities of the parent compounds, 11β,17α,21-trihydroxyallopregnan-20-one, 17α,21 - dihydroxyallopregnane - 11,20-dione and the 21-esters thereof, usually in higher degree, and the manner and forms of administration are as hereinbefore described.

In the preparation of the 21-desoxy and 21-fluoro analogs of 11β,17α,21-trihydroxyallopregnan-20-one and 17α,21-dihydroxyallopregnane-11,20-dione, the latter compounds are individually converted to the corresponding 21-methanesulfonates by treatment with methanesulfonyl chloride in pyridine at about zero to twenty degrees centigrade for a period of about thirty minutes to 24 hours. The resulting 21-methanesulfonates are isolated by quenching the pyridine solution with water and filtering when the product is crystalline, or by extracting with a water-immiscible solvent such as methylene chloride when the 21-methanesulfonate is not a solid. Treatment of the 21-methanesulfonates individually with potassium fluoride by warming in dimethylsulfoxide for a period of about one to 24 hours is productive of the corresponding 21-fluoro compounds, i. e., 21-fluoro-11β,17α-dihydroxyallopregnan-20-one and 21-fluoro-17α-hydroxyallopregnane-11,20-dione which can be isolated by diluting with water and filtering or extracting with a water-immiscible solvent when necessary. The compounds can be purified by recrystallization from acetone if desired. Treatment of the 21-methanesulfonates individually with sodium iodide by refluxing in acetone for a few minutes results in formation of the corresponding 21-iodides. The 21-iodides thus produced are isolated by removal of the solvent and are treated individually with sodium thiosulfate in acetic acid for a period of about fifteen minutes to three hours to produce the corresponding 21-desoxy compounds, i. e., 11β,17α-dihydroxyallopregnan-20-one and 17α - hydroxyallopregnane-11,20-dione which can be isolated and purified by conventional means. Alternatively, the 11-keto-21-fluoro and 11-keto-21-desoxy compounds above can be prepared from the corresponding 11β-hydroxy compounds by oxidation with, for example, chromic acid in acetic acid, i. e., by methods hereinbefore described for oxidation of 11β-hydroxy compounds.

The 9α-halo, 9α-halo-21-desoxy, and 9α-halo-21-fluoro derivatives of 11-oxygenated 17α,21-dihydroxyallopregnan-20-one are conveniently prepared, for example, by dehydrating 11β,17α,21 - trihydroxyallopregnan - 20-one 21-acetate (VIII) with N-bromoacetamide and anhydrous sulfur dioxide in pyridine until a negative acidified potassium iodide-starch test of the reaction mixture is obtained. Dilution with water results in precipitation of 17α,21-dihydroxy-9(11)-allopregnen-20-one 21-acetate which can be purified by recrystallization from acetone. The crystalline product can then be caused to react in methylene chloride-tertiary butyl alcohol solution with perchloric acid and N-bromoacetamide or N-iodoacetamide to produce a reaction mixture from which 9α-bromo-11β,17α,-21-trihydroxyallopregnan-20-one 21-acetate or the corresponding 9-iodo compound, respectively, can be recovered by precipitation with water and recrystallization from acetone. The latter compounds can be caused to react in acetone solution with anhydrous potassium acetate at reflux temperature to produce 9β,11β-oxido-17α,21-dihydroxyallopregnan-20-one 21-acetate which is recoverable from the reaction mixture by dilution with water and can be purified by chromatography and recrystallization from acetone-Skellysolve B hexanes mixture. Reaction of this oxide in methylene chloride solution with aqueous hydrogen fluoride at room temperature or with anhydrous hydrogen fluoride at lower temperatures, e. g., minus twenty to plus twenty degrees centigrade, is productive of 9α-fluoro - 11β,17α,21 - trihydroxyallopregnan-20-one 21-acetate. Substitution of hydrogen chloride for hydrogen fluoride above is productive of 9α-chloro-11β,17α,21-trihydroxyallopregnan-20-one 21-acetate. Oxidation of the said 9α-fluoro and 9α-chloro compounds with chromic acid in acetic acid is productive of the corresponding 11-keto compounds, 9α-fluoro-17α,21-dihydroxyallopregnane-11,20-dione 21-acetate and 9α-chloro-17α,21-dihydroxyallopregnane-11,20-dione 21-acetate, respectively.

In the above sequence of reactions, 11β,17α,21-trihydroxyallopregnan-20-one 21-acetate (VIII) was illustratively converted to the corresponding 9α-halo compounds. In the same manner other 21-esters of 11β,17α,21 - trihydroxyallopregnan - 20 - one may be used as the starting material. Preferred esters are those wherein the acyl radical is that of an organic carboxylic acid, preferably a hydrocarbon carboxylic acid containing from one to twelve carbon atoms, inclusive. The ester group of any selected 21-acyloxy starting steroid will remain throughout the sequence of reactions as illustrated with regard to the acetate, thus being productive of the selected 21-acylate intermediate compounds corresponding to the 21-acetoxy compounds indicated.

The foregoing compounds, 9α - halo - 11β,17α,21- trihydroxyallopregnan-20-one 21-acylate and 9α-halo-17α,21-dihydroxyallopregnane-11,20-dione 21-acylate, can be hydrolyzed to the corresponding 21-hydroxy compounds according to known methods for hydrolyzing Compound F 21-acetate to Compound F, for example, in aqueous methanolic solution with potassium bicarbonate under oxygen-free conditions. The 21-hydroxy compounds, 9α-fluoro-11β,17α,21-trihydroxyallopregnan-20-one, 9α - fluoro - 17α,21 - dihydroxyallopregnane-11,20-dione, 9α - chloro - 11β,17α,21 - trihydroxyallopregnan-20-one, and 9α - chloro - 17α,21 - dihydroxyallopregnane-11,20-dione, thus produced, can be converted to the corresponding 21-desoxy and 21-fluoro compounds, e. g., 9α - fluoro - 11β,17α - dihydroxyallopregnan - 20 - one, 9α,21 - difluoro - 11β,17α - dihydroxyallopregnan-20-one, 9α - fluoro - 17α - hydroxyallopregnane - 11,20 - dione, 9α,21 - difluoro - 17α - hydroxyallopregnane - 11,20-dione, and the corresponding 9α - chloro compounds, by procedures hereinabove described for the conversion of 11β,17α,21 - trihydroxyallopregnan - 20 - one and 17α,21-dihydroxyallopregnane - 11,20 - dione to the corresponding 21-desoxy and 21-fluoro derivatives. Similarly, hydrolyzing 17α,21 - dihydroxy - 9(11) - allopregnen - 20-one 21-acetate with potassium bicarbonate to obtain 17α,21 - dihydroxy - 9(11) - allopregnen - 20 - one, treating the latter compound with methanesulfonyl chloride in pyridine to obtain the 21-methanesulfonate and replacing the 21-methanesulfonyl group with fluorine or hydrogen as described hereinabove, is productive of 17α - hydroxy - 9(11) - allopregnen - 20 - one and 21-fluoro - 17α - hydroxy - 9(11) - allopregnen - 20-one.

Reacting these two compounds, i. e., 17α-hydroxy-9(11) - allopregnen - 20 - one and 21 - fluoro - 17α-hydroxy - 9 (11) - allopregnen - 20 - one with perchloric acid and N-bromoacetamide or N-iodoacetamide produces the 9α - bromo - 11β,17α - dihydroxyallopregnan - 20-one and 9α - bromo - 21 - fluoro - 11β,17α - dihydroxyallopregnan-20-one, respectively, or the corresponding 9α-iodo compounds. These latter compounds can then be converted to the corresponding 9β,11β-oxido compounds by reaction in acetone solution with anhydrous potassium acetate and the latter 9β,11β-oxido compounds then converted to the corresponding 9α-fluoro or 9α-chloro compounds, e. g., 9α-fluoro-11β,17α-dihydroxyallopregnan - 20 - one, 9α,21 - difluoro - 11β,17α-dihydroxyallopregnan - 20 - one, 9α - fluoro - 17α-hydroxyallopregnan-11,20-dione, 9α,21-difluoro-17α-hydroxyallopregnane-11,20-dione, and the corresponding 9α-chloro compounds by the procedures described above for the conversion of 17α,21-dihydroxy-9(11)-allopregnen-20-one 21-acetate to 9α-fluoro- (or 9α-chloro)-11β,17α,21-trihydroxyallopregnan-20-one 21-acetate.

The following preparations and examples are illustrative of the process and products of the present invention, but are not to be construed as limiting.

PREPARATION 1

11,20-diketo-3,5-pregnadiene

A mixture of eighteen grams of freshly prepared W–4 Raney nickel catalyst and 250 milliliters of acetone was refluxed for one hour. To the solution was then added 1.8 grams of the 3-benzyl thioenol ether of 11-ketoprogesterone (U. S. Patent 2,698,852) and the mixture was refluxed for four more hours. The cooled solution was filtered and the filtrate distilled at reduced pressure until crystallization of the product occurred. The crystals thus obtained were recrystallized from a mixture of acetone and heptane to give 11,20-diketo-3,5-pregnadiene melting at 138 to 142 degrees centigrade. A second crystallization of these crystals raised the melting point of 141.5 to 143 degrees centigrade. This product had ultraviolet absorption maxima, $a_M$ of 17,200 at 228 millimicrons, 18,200 at 234 millimicrons, and 11,315 at 242 millimicrons, and a rotation of $[\alpha]_D^{23}$ of plus 41 degrees in chloroform and the analysis below:

*Analysis.*—Calculated for $C_{21}H_{28}O_2$: C, 80.73; H, 9.03. Found: C, 80.59; H, 9.13.

PREPARATION 2

*Allopregnane-11,20-dione*

A solution of 2.5 grams of 11,20-diketo-3,5-pregnadiene in 100 milliliters of ethyl acetate containing 1.25 grams of a five percent palladium on charcoal catalyst was shaken in a hydrogen atmosphere. The theoretical uptake of hydrogen was rapid and complete. The mixture was then filtered to remove the catalyst and the filtrate distilled to a small volume and then diluted with methanol until crystallization commenced. There was thus obtained 1.72 grams of allopregnane-11,20-dione as plates which melted at 139.5 to 141 degrees centigrade, had an $[\alpha]_D$ of plus 122 degrees in chloroform, and the analysis below:

*Analysis.*—Calculated for $C_{21}H_{32}O_2$: C, 79.69; H, 10.19. Found: C, 79.60; H, 9.97.

A mono-2,4-dinitrophenylhydrazone was prepared which melted at 209 to 210 degrees centigrade.

EXAMPLE 1

*21 - methoxyoxalylallopregnane - 11,20 - dione sodium salt (II)*

A solution of 6.33 grams of allopregnane-11,20-dione (I) in sixty milliliters of tertiary butyl alcohol and 6.3 milliliters of ethyl oxalate (diethyl oxalate) was stirred at fifty degrees centigrade under a nitrogen atmosphere and 6.52 grams of 25 percent (weight/weight) sodium methoxide in methanol was added. The mixture was stirred for one hour and ether was added. No precipitate resulted, and the solvents were then removed from the reaction mixture by evaporation leaving a viscous residue. The residue was treated with ice water and 100 milliliters of ether, giving a transparent gel which was collected by filtration, pressed dry, washed with ether, and air dried to give seven grams of 21-methoxyoxalylallopregnane-11,20-dione sodium salt (II) as a white solid having a melting point of 185 degrees centigrade with decomposition. The dry product was soluble in ether, insoluble in cold water, and soluble in hot water.

EXAMPLE 2

*Methyl 11-keto-17(20)-allopregnen-21-oate (IV)*

A solution containing 6.33 grams of allopregnane-11,20-dione (I), 6.3 milliliters of ethyl oxalate and 6.45 grams of 25 percent (weight/weight) sodium methoxide in methanol in 51 milliliters of tertiary butyl alcohol was at 35 to fifty degrees centigrade under nitrogen for one hour and forty minutes. (When cooled to below thirty degrees centigrade the glyoxalate sodium salt precipitated.) The mixture was cooled to zero degrees centigrade and a solution of 1.7 milliliters of acetic acid and 4.1 grams of anhydrous sodium acetate in seventy milliliters of cold methanol was added, followed by addition of a solution of 6.39 grams of bromine in forty milliliters of cold methanol over a period of fifteen minutes. After several minutes the dibromo glyoxalate (III) precipitated from the almost colorless solution. To this slurry was added 18.16 grams of 25 percent (weight/weight) sodium methoxide in methanol to give a pale yellow solution from which methyl 11-keto-17(20)-allopregnen-21-oate (IV) began to crystallize after about one minute. After one hour the mixture was diluted with a large volume of ice water, and gave seven grams of a precipitate having a melting point of 120 to 157 degrees centigrade. The precipitate was recrystallized from methanol and gave 4.8 grams of methyl 11-keto-17(20)-allopregnen-21-oate having a melting point of 160 to 166.5 degrees centigrade. Further recrystallization gave a sample having a melting point of 167.5 to 170 degrees centigrade, a rotation $[\alpha]_D$ of plus 23 degrees (chloroform), an ultraviolet absorption maximum $a_M$ of 11,450 at 224 millimicrons in alcohol, infrared absorption maxima at 1710, 1686 and 1645 reciprocal centimeters (mineral oil mull) and the following analysis:

*Analysis.*—Calculated for $C_{22}H_{32}O_3$: C, 76.70; H, 9.36. Found: C, 76.41; H, 9.02.

EXAMPLE 3

*17(20)-allopregnene-11β,21-diol (V)*

A solution of 4.2 grams of methyl 11-keto-17(20)-allopregnen-21-oate (IV) in 85 milliliters of dry ether was added over a period of fifteen minutes to three grams lithium aluminum hydride in 165 milliliters of dry ether, with stirring. The reaction mixture was heated under reflux for two hours, cooled, decomposed by addition of saturated aqueous ammonium chloride, and filtered. The organic and aqueous phases of the filtrate were separated and the organic phase was evaporated, giving 3.64 grams of a crystalline residue. This residue was recrystallized from acetone and gave a first crop of 3.0 grams of 17(20)-allopregnene-11β,21-diol (V) having a melting point of 139.5 to 141 degrees centigrade, and a second crop of 0.47 gram having a melting point of 135 to 138 degrees centigrade. Further recrystallizations gave an analytical sample of 17(20)-allopregnene-11β-21-diol having a melting point of 142 to 144 degrees centigrade, a rotation $[\alpha]_D$ of plus fourteen degrees (chloroform), infrared absorption maxima of 3260, 1668, 1054, 1027, 1009 and 994 reciprocal centimeters, and the following analysis:

*Analysis.*—Calculated for $C_{21}H_{34}O_2$: C, 79.19; H, 10.76. Found: C, 79.08; H, 10.93.

EXAMPLE 4

*17(20)-allopregnene-11β,21-diol 21-acetate (VI)*

A solution of three grams of 17(20)-allopregnene-11β,21-diol (V) in a mixture of six milliliters of pyridine and four milliliters of acetic anhydride was allowed to stand for eighteen hours at 25 to thirty degrees centigrade, then was poured into a large volume of ice water giving 2.67 grams of precipitate having a melting point of 110 to 117 degrees centigrade. This was recrystallized to give 17(20)-allopregnene-11β,21-diol 21-acetate having a melting point of 118 to 119 degrees centigrade, a rotation $[\alpha]_D$ of plus 21 degrees (chloroform) infrared absorption maxima at 3530, 1677, 1719, 1265 and 1238 reciprocal centimeters (mineral oil mull) and the following analysis:

*Analysis.*—Calculated for $C_{23}H_{36}O_3$: C, 76.62; H, 10.07. Found: C, 77.00; H, 10.06.

Similarly, other 21-organic carboxylic esters of 17(20)-allopregnene-11β,21-diol are prepared wherein the 21-acyl radical is that of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralykl acid, e. g., phenylacetic, phenylpropionic, diphenylacetic, triphenylacetic, an unsaturated acid, e. g., acrylic, maleic, vinyl acetic, propiolic, undecolic, etc.

EXAMPLE 5

*11β,17α,21-trihydroxyallopregnan-20-one 21-acetate (VIII)*

To a solution of 2.5 grams of 17(20)-allopregnene-11β,21-diol 21-acetate (VI) in 75 milliliters of tertiary butyl alcohol and 3.5 milliliters of pyridine was added 9.17 milliliters of 1.89 molar N-methylmorpholine oxide peroxide in tertiary butyl alcohol, and 45 milligrams of osmium tetroxide in twenty milliliters of tertiary butyl alcohol. The reaction mixture was stirred at room temperature for 3.25 hours, then fifty milliliters of 0.5 percent aqueous sodium sulfite was added, followed by two grams of diatomaceous filter aid, and the mixture was stirred 1.5 hours, then was filtered. The filter cake was washed with methanol and the filtrate and wash were combined and concentrated by evaporation under diminished pressure until a dense mass of crystals separated. The crystals, collected by filtration, weighed 2.77 grams and had a melting point of 170 to 178 degrees centigrade. The 2.77 grams of crystals was chromatographed over 160 grams of Florisil synthetic magnesium silicate. Elution with five percent acetone in petroleum ether gave two grams of 11β,17α,21-trihydroxyallopregnan-20-one 21-acetate (VIII) which was recrystallized from a mixture of acetone and Skellysolve B hexanes to give two crops of 11β,17α,21-trihydroxyallopregnan-20-one 21-acetate; 0.42 gram having a melting point of 201 to 204 degrees centigrade and 0.86 gram having a melting point of 199 to 204 degrees centigrade. Both crops had infrared absorption maxima at 3560, 3470, 1770, 1716, 1264, 1243, and 1233 reciprocal centimeters (mineral oil mull).

In the same manner as given above, treating other 17(20)-allopregnene-11β-21-diol 21-acylates, wherein the 21-acyl group is that of an organic carboxylic acid, preferably a hydrocarbon carboxylic acid containing from one to twelve carbon atoms, inclusive, with N-methylmorpholine oxide peroxide in the presence of osmium tetroxide is productive of the corresponding 11β,17α,21-trihydroxyallopregnan-20-one 21-acylates.

EXAMPLE 6

*17α,21-dihydroxyallopregnane-11,20-dione 21-acetate (IX)*

A solution is prepared containing 0.5 gram of 11β,17α,21 - trihydroxyallopregnan - 20 - one 21 - acetate (VIII), 0.15 gram of chromium trioxide, ten milliliters of glacial acetic acid, and 0.5 milliliter of water. This mixture is stirred and maintained at room temperature for eight hours. Thereafter excess oxidant is destroyed by the addition of methanol and the mixture is poured into fifty milliliters of ice water. The thus-precipitated 17α,21-dihydroxyallopregnane-11,20-dione (IX) is collected on a filter, washed with water, and dried.

Similarly, treating other 11β,17α,21-trihydroxyallopregnan-20-one 21-acylates, wherein the 21-acyloxy group is that of an organic carboxylic acid, preferably that of a hydrocarbon carboxylic acid containing from one to twelve carbon atoms, inclusive, with chromium trioxide in aqueous acetic acid is productive of the corresponding 17α,21-dihydroxyallopregnane-11,20-dione 21-acylate.

Alternatively, 17α,21 - dihydroxyallopregnane - 11,20-dione 21-acetate is prepared from 17(20)-allopregnane-11β,21-diol 21-acetate by first oxidizing 17(20)-allopregnene-11β,21-diol 21-acetate (VI) with chromium trioxide in aqueous acetic acid, in the manner given in Example 6 above to produce 21-hydroxy-17(20)-allopregnen-11-one 21-acetate (VII) and then causing the latter compound to react with N-methylmorpholine oxide peroxide in the presence of osmium tetroxide, in the same manner as given in Example 5, to produce 17α,21-dihydroxyallopregnane-11,20-dione 21-acetate. Similarly, starting with other 17(20)-allopregnene-11β,21-diol 21-acylates, wherein the acyloxy group is that of a hydrocarbon carboxylic acid, preferably a hydrocarbon carboxylic acid containing from one to twelve carbon atoms, inclusive, is productive of the corresponding 21-hydroxy-17(20)-allopregnen-11-one 21-acylates and 17α,21-dihydroxyallopregnane-11,20-dione 21-acylates.

EXAMPLE 7

*21-hydroxy-17(20)-allopregnen-11-one*

A solution of one gram of 21-hydroxy-17(20)-allopregnen-11-one 21-acetate in 25 milliliters of 95 percent ethanol and 2.5 milliliters of water containing 0.5 gram of potassium hydroxide is allowed to stand at 25 to thirty degrees centigrade for six hours, then is neutralized by the addition of sulfuric acid and poured into 300 milliliters of ice water. The resulting mixture is extracted with three fifty-milliliter portions of methylene chloride, and the methylene chloride solutions are combined, washed with water, dried over anhydrous sodium sulfate, and evaporated to give a residue of crude 21-hydroxy-17(20)-allopregnen-11-one which can be purified by crystallization from acetone or methanol.

EXAMPLE 8

*11β,17α,21-trihydroxyallopregnan-20-one (X)*

A solution of one gram of 11β,17α,21-trihydroxyallopregnan-20-one 21-acetate (VIII), one gram of potassium bicarbonate, 100 milliliters of methanol and fifteen milliliters of water is purged with nitrogen and stirred at 25 degrees centigrade for four hours. The solution is then neutralized with acetic acid and the methanol is removed by evaporation under reduced pressure. The residue is extracted with 100 milliliters of methylene chloride and the extract is dried over sodium sulfate, then the solvent is removed by evaporation under diminished pressure to obtain 11β,17α,21 - trihydroxyallopregnan - 20 - one (X) which is purified by chromatography over synthetic magnesium silicate and crystallization from methanol.

Similarly, other 11β,17α,21-trihydroxyallopregnan-20-one 21-acylates wherein the 21-acyloxy group is that of an organic carboxylic acid, preferably that of a hydrocarbon carboxylic acid containing from one to twelve carbon atoms, inclusive, can be hydrolyzed in the same manner given above to obtain 11β,17α,21-trihydroxyallopregnan-20-one.

EXAMPLE 9

*17α,21-dihydroxyallopregnane-11,20-dione (X)*

In the same manner as given in Example 8, treating 17α,21-dihydroxyallopregnane-11,20-dione 21-acetate, or other 21-acylates, with potassium bicarbonate in methanol is productive of 17α,21-dihydroxyallopregnane-11,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 11-oxygenated 17α,21-dihydroxyallopregnan-20-one of the following formula:

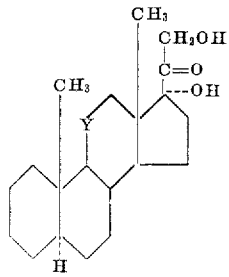

wherein Y is a member selected from the group consisting of the carbonyl radical and the β-hydroxymethylene radical; and the 21-acylates thereof wherein the acyl radical is that of a hydrocarbon carboxylic acid containing from one to twelve carbon atoms, inclusive.

2. 11β,17α,21-trihydroxyallopregnan-20-one and the 21-acylates thereof, wherein the acyl radical is that of a hydrocarbon carboxylic acid containing from one to twelve carbon atoms, inclusive.

3. 11β,17α,21-trihydroxyallopregnan-20-one 21-acetate.
4. 11β,17α,21-trihydroxyallopregnan-20-one.
5. 17α,21-dihydroxyallopregnane-11,20-dione and the 21-acylates thereof, wherein the acyl radical is that of a hydrocarbon carboxylic acid containing from one to twelve carbon atoms, inclusive.
6. 17α,21-dihydroxyallopregnane-11,20-dione 21-acetate.
7. 17α,21-dihydroxyallopregnane-11,20-dione.
8. 11-oxygenated 17(20)-allopregnen-21-ol of the following formula:

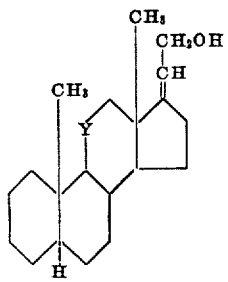

wherein Y is a member selected from the group consisting of the carbonyl radical and the β-hydroxymethylene radical and the 21-acylates thereof wherein the acyl radical is that of a hydrocarbon carboxylic acid containing from one to twelve carbon atoms, inclusive.

9. 17(20)-allopregnene-11β,21-diol and the 21-acylates thereof wherein the acyl radical is that of a hydrocarbon carboxylic acid containing from one to twelve carbon atoms, inclusive.
10. 17(20)-allopregnene-11β,21-diol 21-acetate.
11. 17(20)-allopregnene-11β,21-diol.
12. 21-hydroxy-17(20)-allopregnen-11-one and the 21-acylate thereof wherein the acyl radical is that of a hydrocarbon carboxylic acid containing from one to twelve carbon atoms, inclusive.
13. 21-hydroxy-17(20)-allopregnen-11-one 21-acetate.
14. 21-hydroxy-17(20)-allopregnen-11-one.
15. 11-keto-17(20)allopregnen-21-oic acid and the lower alkyl esters thereof.
16. 11-keto-17(20)-allopregnen-21-oic acid.
17. Methyl 11-keto-17(20)-allopregnen-21-oate.
18. 21 - alkoxyoxalyl - 21,21 - dihaloallopregnane - 11,20-dione of the following formula:

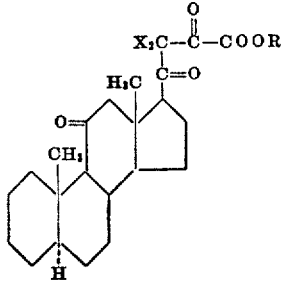

wherein R is a lower-alkyl radical and X is halogen of atomic weight between 35 and eighty, inclusive.

19. 21 - methoxyoxalyl - 21,21 - dibromoallopregnane-11,20-dione.
20. 21 - alkoxyoxalylallopregnane - 11,20 - dione alkali metal enolate of the following formula:

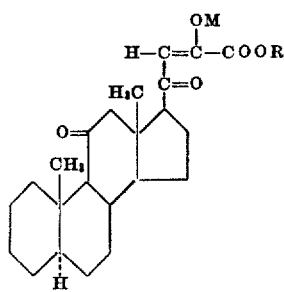

wherein R is a lower-alkyl group and M is an alkali metal selected from the group consisting of sodium and potassium.

21. 21 - methoxyoxalylallopregnene - 11,20 - dione sodium enolate.

References Cited in the file of this patent
UNITED STATES PATENTS

| | | |
|---|---|---|
| 2,541,105 | Sarett | Feb. 13, 1951 |
| 2,752,366 | Hogg et al. | June 26, 1956 |
| 2,769,823 | Schneider et al. | Nov. 6, 1956 |
| 2,774,776 | Hogg et al. | Dec. 18, 1956 |

UNITED STATES PATENT OFFICE

CERTIFICATE OF CORRECTION

Patent No. 2,868,808                                              January 13, 1959

John C. Babcock

It is hereby certified that error appears in the printed specification of the above numbered patent requiring correction and that the said Letters Patent should read as corrected below.

Column 5, line 12, for "propionic" read — propiolic —.

Signed and sealed this 14th day of July 1959.

(SEAL)
Attest:
KARL H. AXLINE                                              ROBERT C. WATSON
Attesting Officer                                          Commissioner of Patents